United States Patent
Kush et al.

(10) Patent No.: US 8,327,911 B2
(45) Date of Patent: Dec. 11, 2012

(54) METHOD FOR FORMING A CAST ARTICLE

(75) Inventors: Matthew T. Kush, Martinsville, IN (US); Max Eric Schlienger, Napa, CA (US); Paul Anthony Withey, Deby (GB)

(73) Assignee: Rolls-Royce Corporation, Indianapolis, IN (US)

( * ) Notice: Subject to any disclaimer, the term of this patent is extended or adjusted under 35 U.S.C. 154(b) by 23 days.

(21) Appl. No.: 12/853,069

(22) Filed: Aug. 9, 2010

(65) Prior Publication Data

US 2011/0048664 A1  Mar. 3, 2011

Related U.S. Application Data

(60) Provisional application No. 61/232,453, filed on Aug. 9, 2009.

(51) Int. Cl.
*B22D 29/00* (2006.01)

(52) U.S. Cl. ............................................. 164/132; 164/6
(58) Field of Classification Search ............... 164/6, 132
See application file for complete search history.

(56) References Cited

U.S. PATENT DOCUMENTS

| | | |
|---|---|---|
| 3,810,711 A | 5/1974 | Emmerson et al. |
| 3,963,368 A | 6/1976 | Emmerson |
| 4,056,586 A | 11/1977 | Pryor et al. |
| 5,073,459 A | 12/1991 | Smarsly et al. |
| 5,214,011 A | 5/1993 | Breslin |
| 5,456,833 A | 10/1995 | Butcher et al. |
| 5,584,948 A | 12/1996 | Huron |
| 5,634,771 A | 6/1997 | Howard et al. |
| 6,435,824 B1 | 8/2002 | Schell et al. |
| 6,443,700 B1 | 9/2002 | Grylls et al. |
| 6,648,596 B1 | 11/2003 | Grylls et al. |
| 7,374,717 B2 | 5/2008 | Yamada |
| 2005/0249602 A1 | 11/2005 | Freling et al. |
| 2007/0122606 A1 | 5/2007 | Meier et al. |
| 2007/0274854 A1 | 11/2007 | Kelly et al. |
| 2008/0149295 A1 | 6/2008 | Frasier et al. |
| 2008/0254276 A1 | 10/2008 | James et al. |

OTHER PUBLICATIONS

International Search Report and Written Opinion, PCT/US2010/044902, Rolls-Royce Corporation, The International Searching Authority, Nov. 5, 2010.

*Primary Examiner* — Nicholas D'Aniello

(74) *Attorney, Agent, or Firm* — Krieg DeVault LLP

(57) ABSTRACT

One embodiment of the present invention is a unique method for forming a cast porous article. Other embodiments include apparatuses, systems, devices, hardware, methods, and combinations for forming cast porous articles. Further embodiments, forms, features, aspects, benefits, and advantages of the present application shall become apparent from the description and figures provided herewith.

24 Claims, 7 Drawing Sheets

METHOD FOR FORMING A CAST ARTICLE

CROSS REFERENCE TO RELATED APPLICATIONS

The present application claims the benefit of U.S. Provisional Patent Application No. 61/232,453, filed Aug. 9, 2009, and is incorporated herein by reference.

FIELD OF THE INVENTION

The present invention relates generally to castings, and more particularly in one form to processing a porous cast article.

BACKGROUND

Casting technology, including casting porous articles, remains an area of interest. Some existing systems have various shortcomings, drawbacks, and disadvantages relative to certain applications. Accordingly, there remains a need for further contributions in this area of technology.

SUMMARY

One embodiment of the present invention is a unique method for forming a cast porous article. Other embodiments include apparatuses, systems, devices, hardware, methods, and combinations for forming cast porous articles. Further embodiments, forms, features, aspects, benefits, and advantages of the present application shall become apparent from the description and figures provided herewith.

BRIEF DESCRIPTION OF THE DRAWINGS

The description herein makes reference to the accompanying drawings wherein like reference numerals refer to like parts throughout the several views, and wherein.

DETAILED DESCRIPTION

Figure 1:
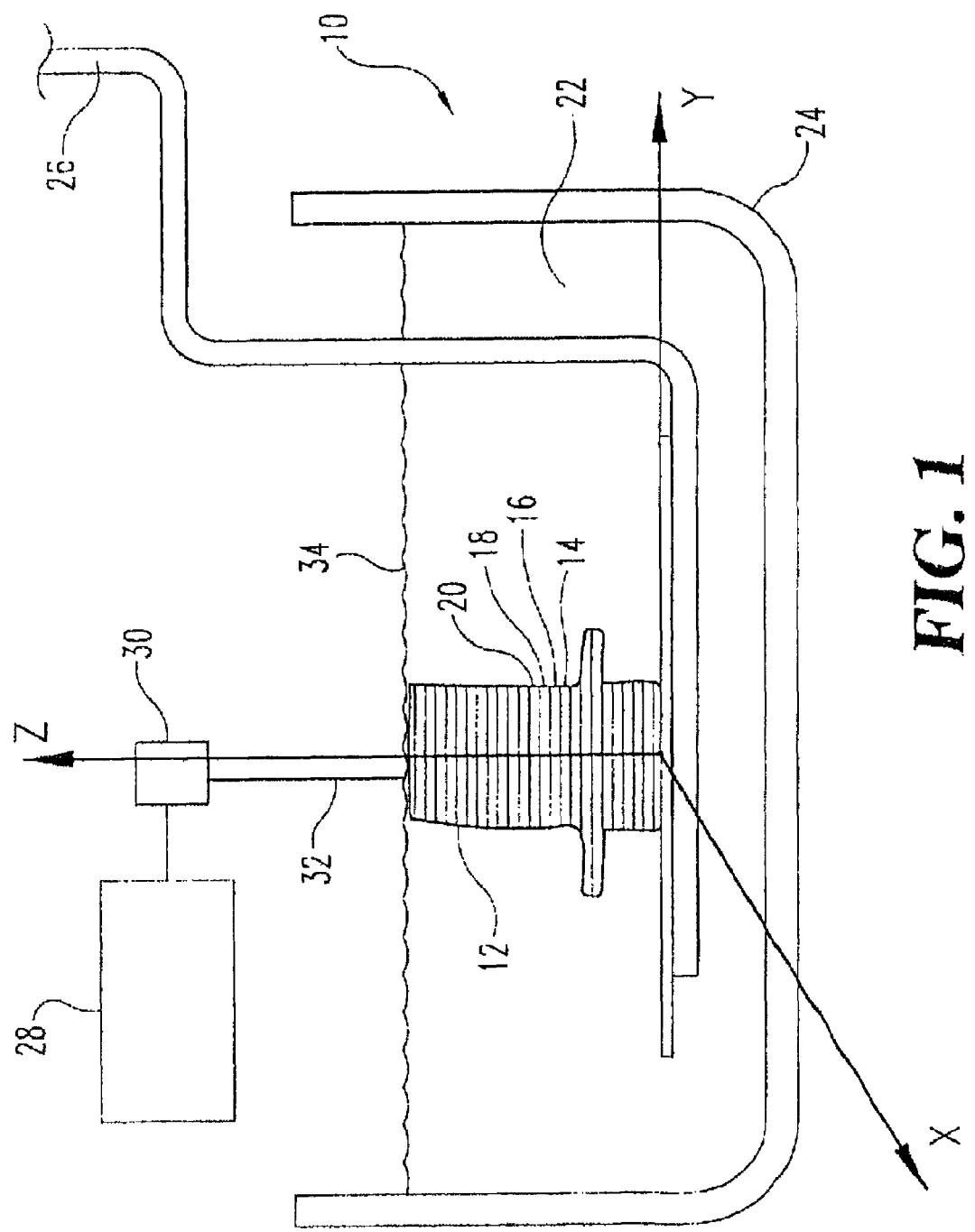
FIG. 1 is a system for freeform fabricating a casting mold in accordance with an aspect of the present invention.

For purposes of promoting an understanding of the principles of the invention, reference will now be made to the embodiments illustrated in the drawings, and specific language will be used to describe the same. It will nonetheless be understood that no limitation of the scope of the invention is intended by the illustration and description of certain embodiments of the invention. In addition, any alterations and/or modifications of the illustrated and/or described embodiment(s) are contemplated as being within the scope of the present invention. Further, any other applications of the principles of the invention, as illustrated and/or described herein, as would normally occur to one skilled in the art to which the invention pertains, are contemplated as being within the scope of the present invention.

Referring to FIG. 1, there is schematically illustrated a non-limiting example of a freeform fabrication system 10 for freeform fabrication of a component, such as a ceramic gas turbine engine blade, in accordance with an embodiment of the present invention. Ceramic materials contemplated herein include, but are not limited to, alumina, zirconia, silica, yittria, magnesia, and mixtures thereof. In one form, system 10 is a selective laser activation (SLA) stereolithography system. Selective laser activation is based upon a stereolithography process that utilizes resins which solidify when exposed to an energy dose. In one form, the resin includes ceramic particles disposed within a photo-polymerizable monomer(s) and/or oligomer(s), and the energy dose is a polymerizing energy dose. The present application contemplates the use of an oligomer(s) resin alone or in combination with a monomer resin. Although the present application is described with respect to a component in the form of ceramic blade mold 12, it will be understood that the present application is also applicable to other types of materials and to other types of components. While the present application will be generally described with respect to an SLA stereolithography system, it is equally applicable to other freeform fabrication systems, such as flash cure systems and other forms of scanned cure systems, as well as other freeform fabrication systems not mentioned herein.

System 10 is used to create gas turbine engine blade mold 12 as a three dimensional ceramic component formed of a plurality of layers, some of which are labeled as layers 14, 16, 18 and 20. In one form, stereolithography system 10 employs a ceramic loaded resin 22, and includes a resin containment reservoir 24, an elevation-changing member 26, a laser source 28 and a scanning device 30 operative to scan a laser beam 32 across elevation changing member 26. Resin containment reservoir 24 is filled with a quantity of ceramic loaded resin 22 from which component 12 is fabricated. In one form, ceramic loaded resin 22 contains a photoinitiator. In another form, ceramic loaded resin 22 contains a dispersant, in addition to the photoinitiator. Scanning device 30 scans a laser beam 32 from laser source 28 across ceramic loaded resin 22, e.g., on a surface 34 ceramic loaded resin 22, in the desired shape to form each layer of gas turbine engine blade mold 12. The ceramic particles contained in ceramic loaded resin 22 ultimately form the completed mold 12.

A three dimensional coordinate system including a first axis, a second axis and a third axis is utilized as a spatial reference for the item being fabricated, e.g., ceramic mold 12. In one form, the three-dimensional coordinate system is a Cartesian coordinate system having X, Y and Z axes corresponding to the axes of stereolithography system 10. However, other three-dimensional coordinate systems are contemplated herein, including but not limited to polar, cylindrical and spherical.

In one form, gas turbine engine blade mold 12 is built at a build orientation angle as measured from axis Z. The build orientation angle illustrated in FIG. 1 is zero degrees. Other build orientation angles are fully contemplated herein. The three-dimensional coordinate system is aligned with the build orientation angle. In one form the three dimensional coordinate system of mold 12 and stereolithography system 10 coordinate system are coextensive.

Blade mold 12 is freeform fabricated by system 10 in layer-by-layer fashion by applying an energy dose to cure a film of ceramic-laden photo-polymerizable resin into a polymerized layer, applying a new film of the resin, and applying an energy dose sufficient to both photo-polymerize the new film of resin into a new layer and to provide an overcure to bind the new layer to the previous layer. In one form, each new resin film is formed over the topmost polymerized layer by lowering elevation changing member 26 to submerge the topmost polymerized layer in the ceramic loaded resin 22 in reservoir 24. In other embodiments, new layers of ceramic loaded resin 22 may be applied to the topmost polymerized layer using other means. The process is repeated to form a plurality of polymerized layers, i.e., layers of ceramic particles that are held together by a polymer binder, e.g., such as the illustrated layer 14, 16, 18 and 20. The successively formed cured layers ultimately form the three-dimensional shape of gas turbine engine blade mold 12 having the desired three-dimensional features formed therein. As described herein, the three-dimensional features of blade mold 12 include a controlled porosity distribution in portions of the mold.

In one form, each polymerized layer is on the order of 0.05 mm (0.002 inches) thick, e.g., as measured along the Z axis, which may be referred to as the build direction. Thinner or thicker layers may be employed in other embodiments. For example, the thickness of each layer may vary with the needs of the particular application, including the desired resolution of the finished mold 12. In some embodiments, some layers may have a greater thickness than other layers within the same mold It should understand that there is no intention herein to limit the present application to any particular number of layers or thickness of layers. In addition, although only a single gas turbine engine blade mold 12 is illustrated, it will be understood that a plurality of gas turbine engine blade mold 12 may be formed as a batch in system 10.

In one form, the formation of the polymerized layers includes the use of a leveling technique to level each of the layers of the photo-polymerizable ceramic loaded resin prior to receiving the energy used to polymerize the resin. Examples of leveling techniques include ultrasonic processing; time delay; and/or a mechanically assisted sweep, such as the use of a wiper blade. The present application also contemplates embodiments that do not employ active leveling techniques.

The energy dose used to polymerize and overcure each layer may be varied or otherwise controlled. In one form, the energy dose is controlled by fixing a laser 28 power and beam 32 diameter, and then controlling the laser scan speed (rate) across the resin surface. In another form, such as with a flash cure system, the laser scan speed and laser power are replaced with exposure time and lamp power. In yet another form, the parameters that control cure and overcure are lamp power and scan speed. In other embodiments, other energy sources maybe employed, e.g., UV sources. In various embodiments, other parameters may control cure and/or overcure.

After the formation of blade mold 12 in stereolithography system 10, blade mold 12 may be subjected to additional processing prior to use. In one form, blade mold 12 is subjected to burnout processing and sintering to yield an integral ceramic casting mold for creating a gas turbine engine blade casting. In other embodiments, blade mold 12 may not be subjected to burnout processing or may not be subjected to sintering. In other embodiments, one or more of various techniques may be employed to remove polymeric material from blade mold 12, if desired, and/or to enhance the structural integrity of blade mold 12, if desired, e.g., depending upon the particular application.

Figure 2:
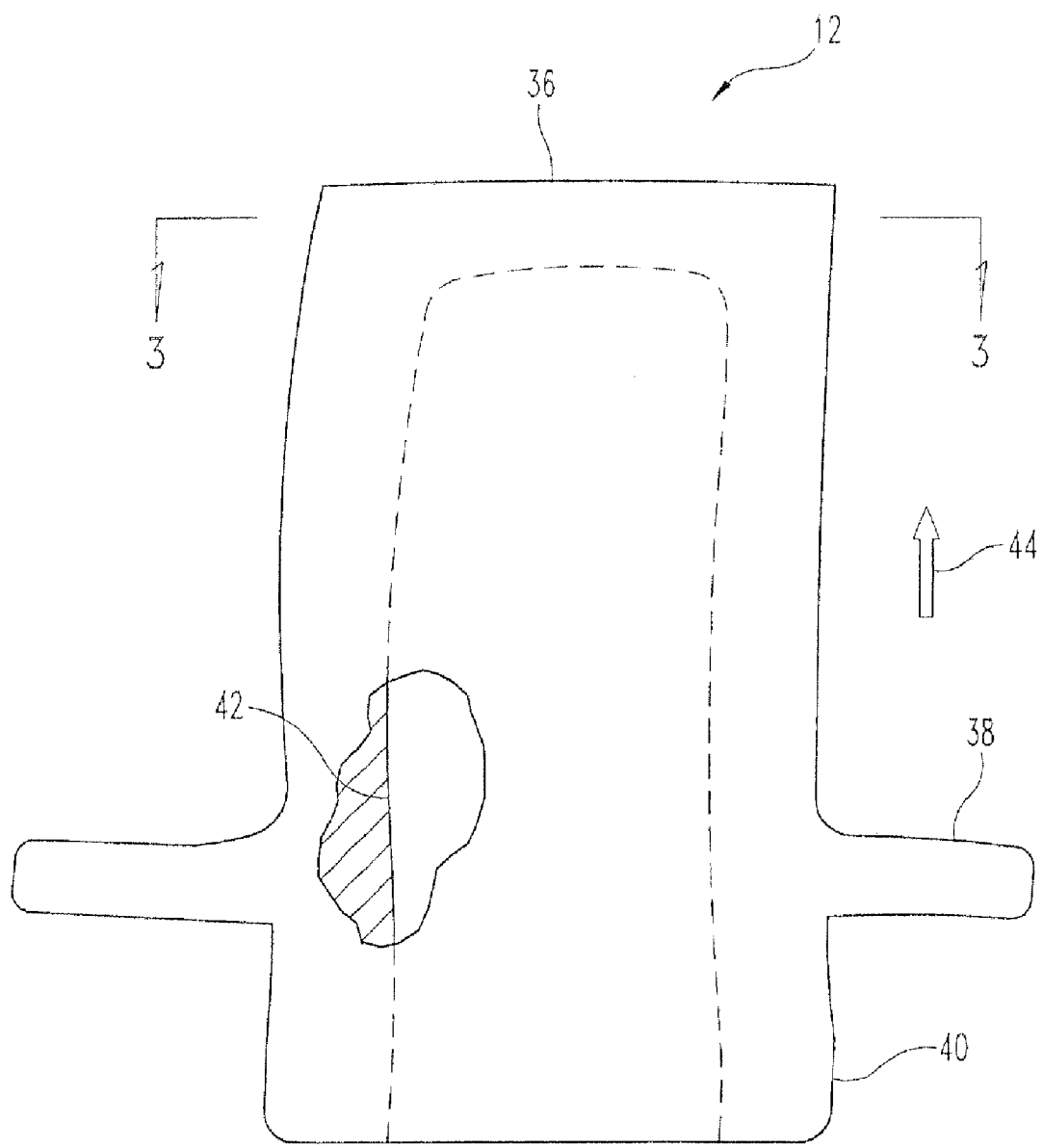
FIG. 2 illustrates a casting mold in accordance with an embodiment of the present invention.
Figure 3:
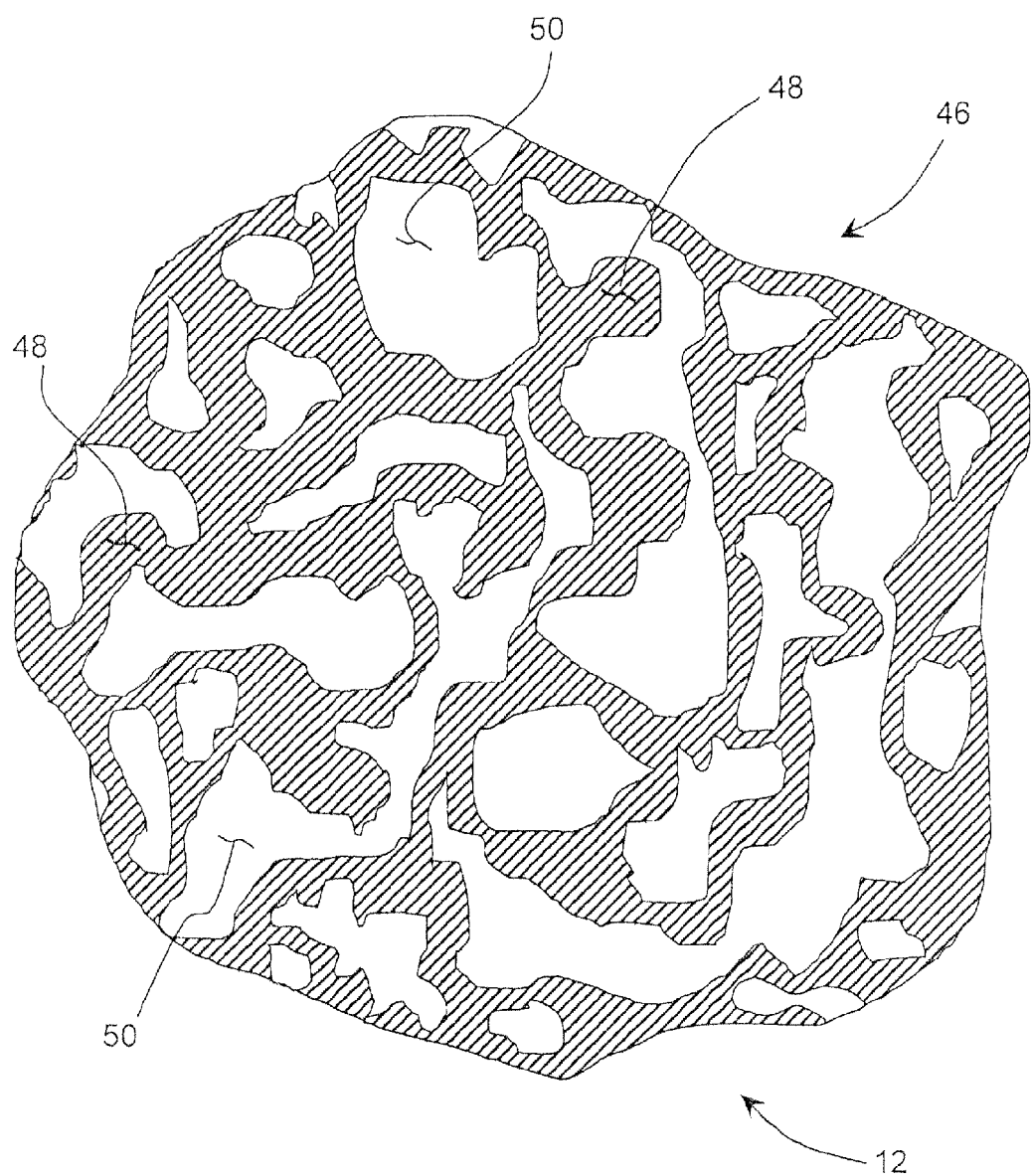
FIG. 3 is an enlarged partial cross section through an airfoil portion of the casting mold of FIG. 2.

Referring now to FIGS. 2 and 3, a non-limiting example of blade mold 12 in accordance with an embodiment of the present invention is depicted. In one form, blade mold 12 includes an airfoil portion 36, a platform portion 38, an attachment portion 40 and a cooling air passage core 42. In other embodiments, blade mold 12 may include other portions not mentioned herein, and/or may not include all of portions 36, 38 and 40. Cooling air passage core 42 extends in a spanwise direction 44 through attachment portion 40. In one form, core 42 forms a single cooling air passage in the blade casting produced using blade mold 12. In other embodiments, core 42 may form a plurality of passages of various orientations, which may or may not be interconnected. In one form, core 42 extends through attachment portion 40 and terminates adjacent to platform portion 38. In another form, core 42 extends further toward airfoil portion 36. In yet another form, core 42 extends through a substantial portion of airfoil portion in spanwise direction 44. In other embodiments, core 42 may extend completely through airfoil portion 36. In still other embodiments, blade mold 12 may not include core 42.

Airfoil portion 36, platform portion 38 and attachment portion 40 are structured to yield an airfoil, platform and attachment in the gas turbine engine blade casting. Portions of blade mold 12 include a controlled porosity distribution 46. In one form, controlled porosity distribution 46 is a distribution of interconnected nodules 48 spaced apart by a plurality of interconnected pores 50 that are formed layer by layer as part of blade mold 12. In one form, interconnected nodules 48 and interconnected pores 50 are operable to form a metal foam or other porous form with an open cell structure in selected portions of the blade casting produced using blade mold 12, e.g., in the airfoil. In other embodiments, a closed cell structure may be formed in the casting by controlled porosity distribution 46. In one form, controlled porosity distribution 46 is generated by defining a desired form, such as the desired geometric shapes, sizes and distribution of interconnected nodules 48 and interconnected pores 50. In one form, interconnected nodules 48 and interconnected pores 50 are defined electronically e.g., using commercially available stereolithography computer aided design (CAD) software to generate an STL (.stl) file. The electronic definition is then supplied to system 10, whereby scanning device 30 selectively cures subsequent layers in order to yield the desired three-dimensional interconnected nodules 48 and interconnected pores 50 based on the STL file.

In one form, blade attachment portion 40 operable to form a fully dense attachment in the blade casting, and hence, does not include a controlled porosity distribution. It will be understood that in other embodiments, controlled porosity distribution 46 may be incorporated into all or part of attachment portion 40. In one form, blade platform portion 38 operable to form a fully dense platform in the blade casting, and hence, does not include a controlled porosity distribution. In another form, blade platform portion 38 includes a controlled porosity distribution 46, e.g., to supply cooling air from the passage formed by core 42 to the airfoil. It will be understood that in other embodiments, controlled porosity distribution 46 may be incorporated into all or part of platform portion 38.

A blade casting is produced using mold 12 by supplying a molten alloy into mold 12, including directing the molten alloy into the interconnected pores 50 of controlled porosity distribution 46. In one form, the alloy is a nickel-based superalloy. In other embodiments, other alloys may be used, including aluminum alloys and titanium alloys. The molten alloy is then solidified, e.g., via cooling. In one form, the molten alloy is solidified in a controlled manner to yield a single crystal structure. In other embodiments, other crystalline structures may be obtained, including but not limited to directionally solidified and equiax crystal orientations. In some embodiments, the crystal structure may not be controlled. Once the alloy is solidified, mold 12 is removed to yield a cast metallic article in the form of a gas turbine engine blade casting. In one form, mold 12 is removed by leaching. In a particular form, interconnected nodules 48 are removed by leaching to yield a blade casting with an airfoil having a plurality of interconnected pores extending therethrough.

Figure 4:
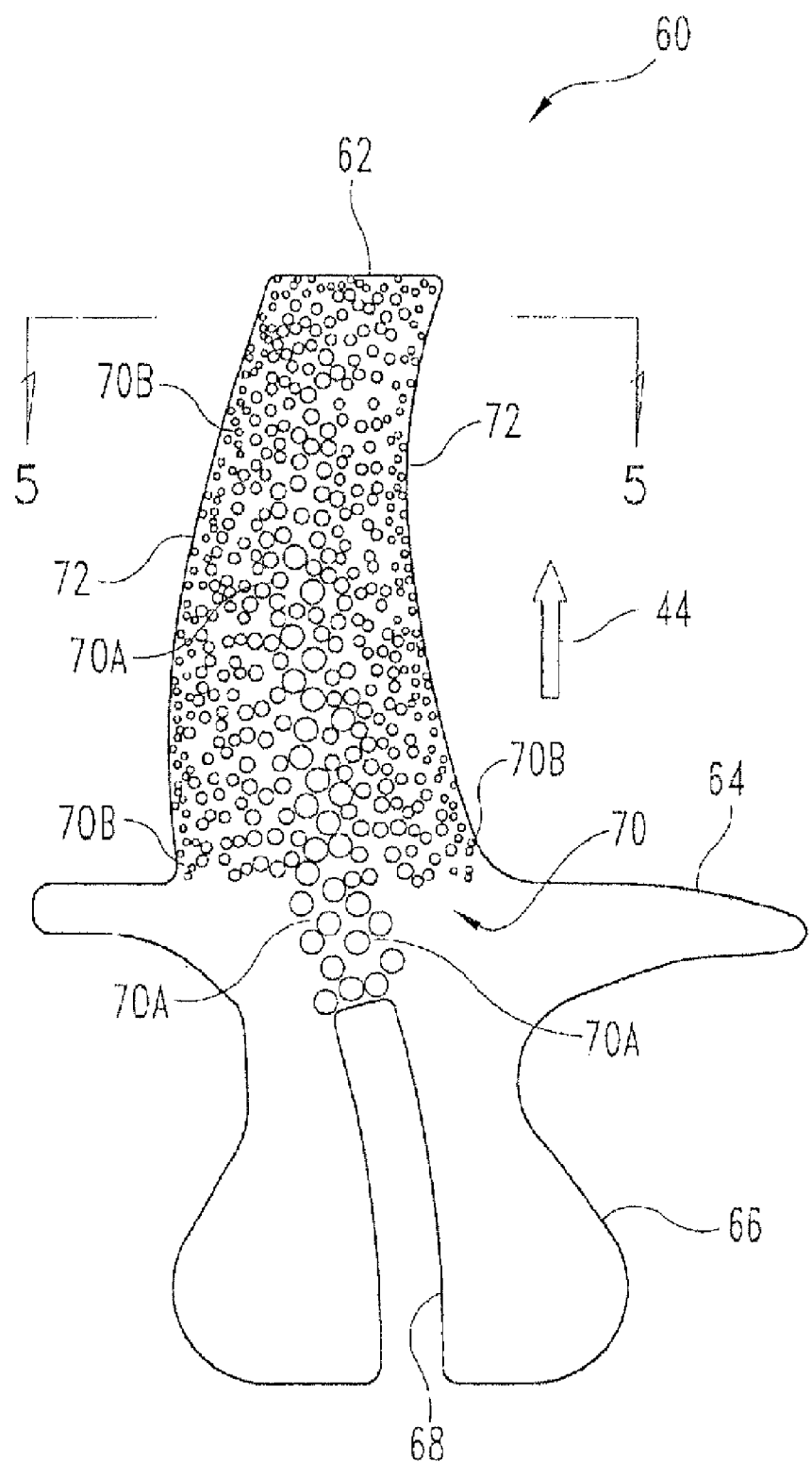
FIG. 4 schematically depicts a cross section of a blade casting produced in accordance with an embodiment of the present invention.
Figure 5:
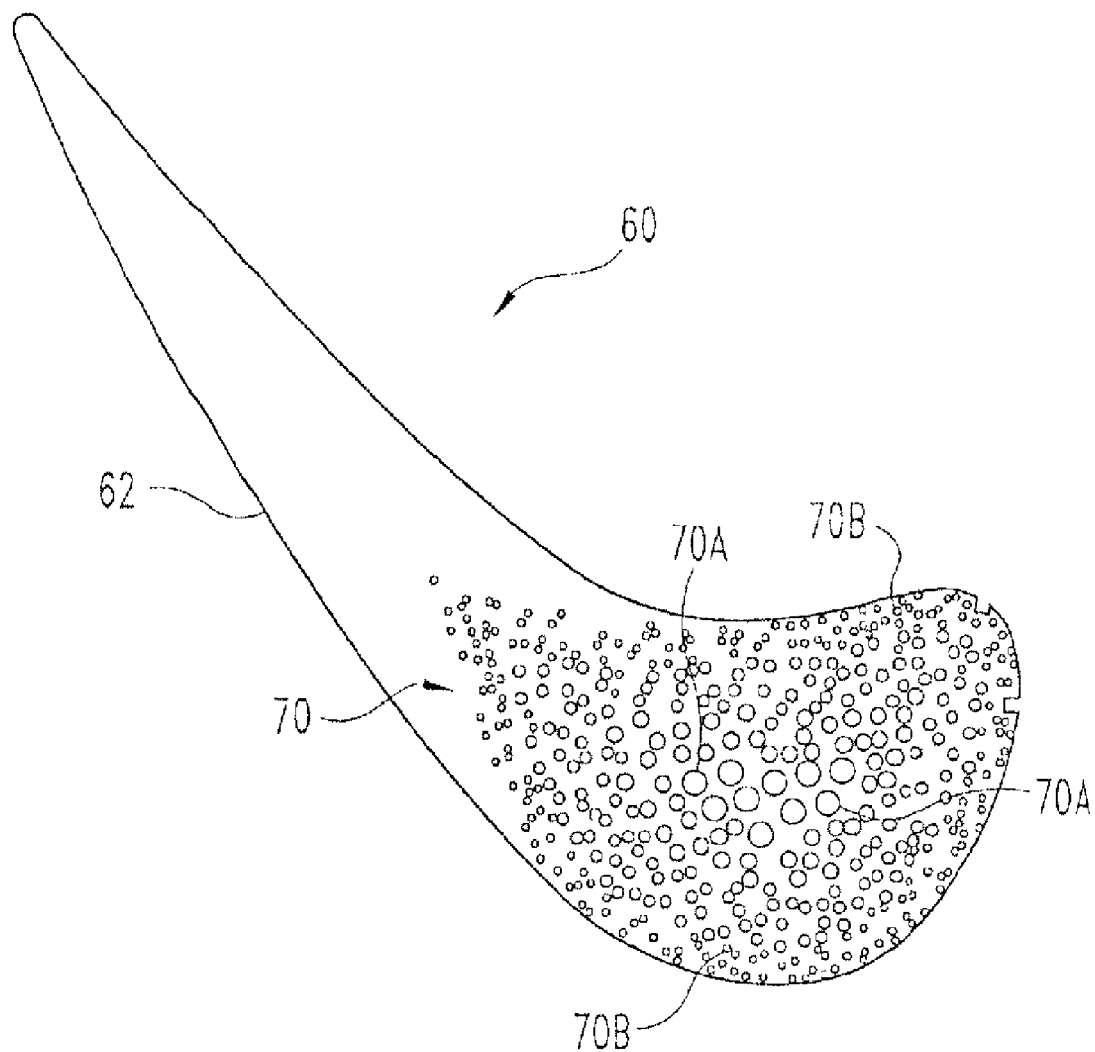
FIG. 5 schematically depicts a cross section of the blade casting of the embodiment of FIG. 4.

Referring now to FIGS. 4 and 5, a non-limiting example of a blade casting 60 produced using casting mold 12 in accordance with an embodiment of the present invention is depicted. In one form, blade casting 60 is a turbine blade. In another form, blade casting 60 is a compressor blade. In yet another form, blade casting 60 is a fan blade. Blade casting 60 includes an airfoil 62, a platform 64, and an attachment 66 having a passage 68. Platform 64 is disposed between airfoil 62 and attachment 66. In one form, passage 68 is a cooling air passage that extends through attachment 66 in spanwise direction 44 toward airfoil 62. In other embodiments, passage 68 may extend in other directions in addition to or in place of direction 44. In still other embodiments, blade casting 60 may be devoid of passages such as passage 68. In one form, airfoil 62, platform 64 and attachment 66 are integrally formed together as a unitary blade casting without the use of bonds or joints using mold 12. In one form, blade casting 60 has a density that varies with location in blade casting 60. In a particular form, blade casting 60 has a metallographic structure that ranges from fully dense, e.g., in attachment 66, to porous, e.g., in airfoil 62.

In one form, controlled porosity distribution 46 in mold 12 forms a plurality of interconnected pores in blade casting 60 to yield a metal foam 70 in blade casting 60. In a particular form metal foam 70 is formed in airfoil 62 and a portion of platform 64. In the depiction of FIGS. 4 and 5, metal foam 70 is depicted in the form of "bubbles" of varying size. In one form, metal foam 70 has a porosity in the range of 10 pores per inch to 100 pores per inch. In a particular form, the porosity ranges from 10 pores per inch to 60 pores per inch. In other embodiments, other porosities may be utilized, including distributions of pores of the same size. In one form, controlled porosity distribution 46 yields a pore size in the blade casting 60 that decreases with increasing proximity to an outer surface of the cast metallic article. For example, as depicted in FIGS. 4 and 5, pores 70A in a central portion of airfoil 62 are of a larger size than pores 70B that are adjacent to an outer surface 72 of airfoil 62. In one form, the pore size in the metallic airfoil is largest in locations adjacent to the passage 68 and transitions to the smallest pore size adjacent to outer surface 72 of airfoil 62. In one form, the plurality of interconnected pores forming metal foam 70 have an open cell structure and are operable to transmit cooling air from passage 68 to outer surface 72 on airfoil 62.

Figure 6:
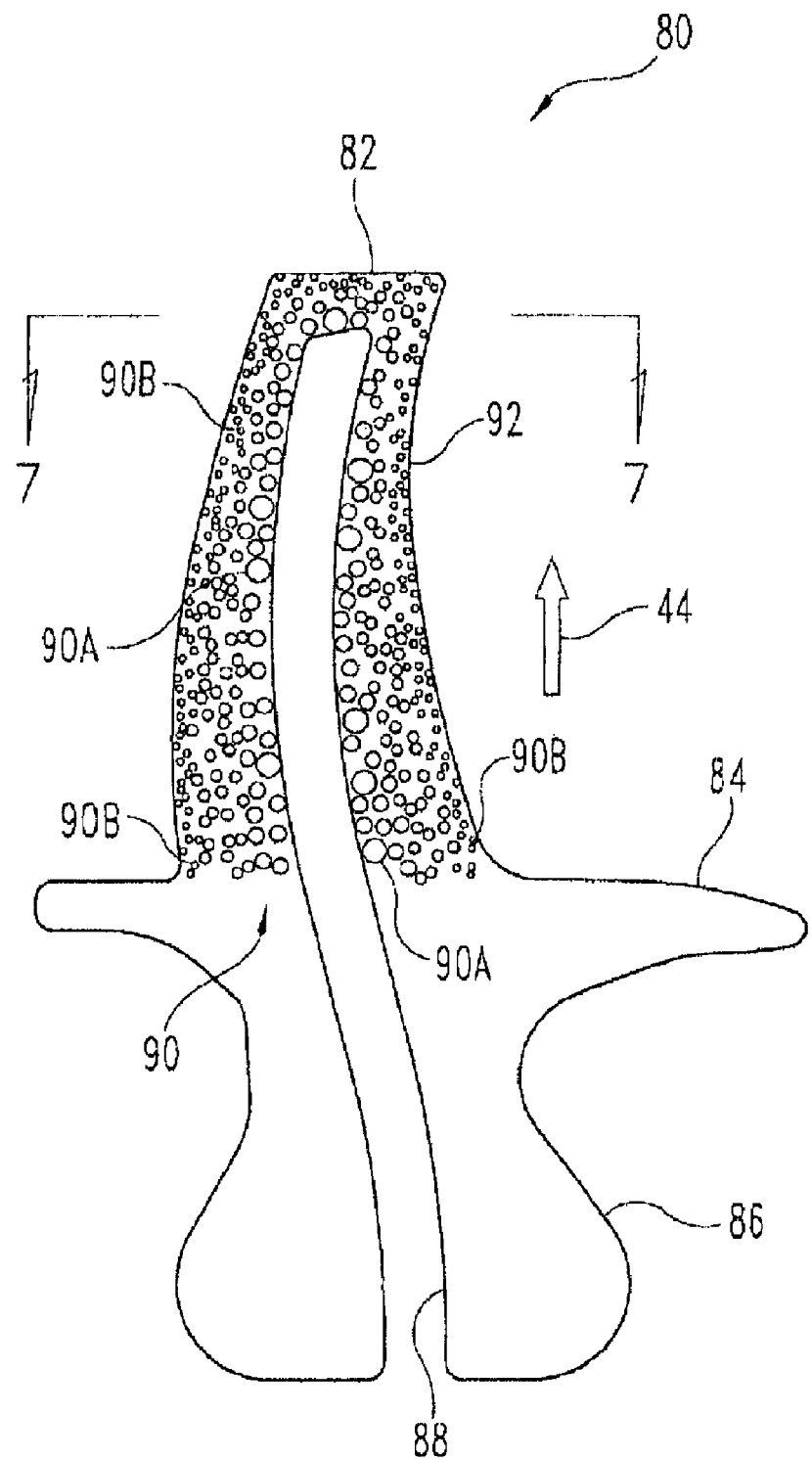
FIG. 6 schematically depicts a cross section of a blade casting produced in accordance with an embodiment of the present invention.
Figure 7:
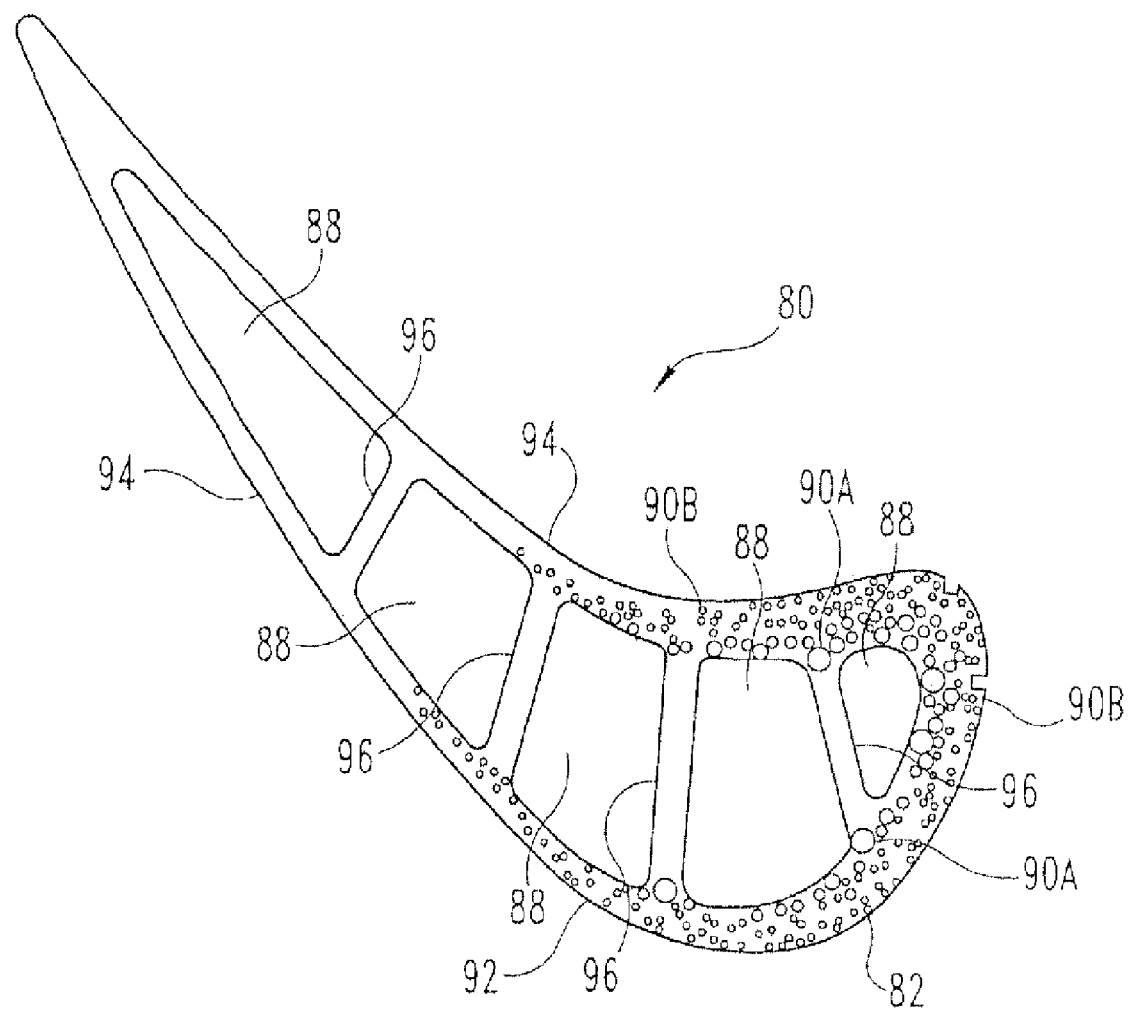
FIG. 7 schematically depicts a cross section of the blade casting of the embodiment of FIG. 6.

Referring now to FIGS. 6 and 7, a non-limiting example of a blade casting 80 produced using casting mold 12 in accordance with an embodiment of the present invention is depicted. In one form, blade casting 80 is a turbine blade. In another form, blade casting 80 is a compressor blade. In yet another form, blade casting 80 is a fan blade. Blade casting 80 includes an airfoil 82, a platform 84, and an attachment 86 having a plurality of passages 88. Platform 84 is disposed between airfoil 82 and attachment 86. In one form, passages 88 are cooling air passages that extend through attachment 86 in spanwise direction 44 and passes through the bulk of airfoil 82. In other embodiments, passages 88 may extend in other directions in addition to or in place of direction 44. In yet other embodiments, passages 88 may extend completely through airfoil 82. In still other embodiments, blade casting 80 may be devoid of passages such as passage 88. In one form, airfoil 82, platform 84 and attachment 86 are integrally formed together as a unitary blade casting without the use of bonds or joints using mold 12. In one form, blade casting 80 has a density that varies with location in blade casting 80. In a particular form, blade casting 80 has a metallographic structure that ranges from fully dense, e.g., in attachment 86, to porous, e.g., in airfoil 82.

In one form, controlled porosity distribution 46 in mold 12 forms a plurality of interconnected pores in blade casting 80 to yield a metal foam 90 in blade casting 80. In a particular form, metal foam 90 is formed in airfoil 82, whereas platform 84 and attachment 86 are fully dense. In other embodiments, platform 84 and/or attachment 86 may not be fully dense, but may have a controlled porosity, such as metal foam 90. In the depiction of FIGS. 6 and 7, metal foam 90 is depicted in the form of "bubbles" of varying size. In one form, metal foam 90 has a porosity in the range of 10 pores per inch to 100 pores per inch. In a particular form, the porosity ranges from 10 pores per inch to 60 pores per inch. In other embodiments, other porosities may be utilized, including distributions of pores of the same size. In one form, controlled porosity distribution 46 yields a pore size in the blade casting 80 that decreases with increasing proximity to an outer surface of the cast metallic article. For example, as depicted in FIGS. 6 and 7, pores 90A in a central portion of airfoil 82 are of a larger size than pores 90B that are adjacent to an outer surface 92 of airfoil 82. In one form, the pore size in the metallic airfoil is the largest in locations adjacent to the passages 88 and transitions to the smallest pore size adjacent to outer surface 92 of airfoil 82. In one form, the plurality of interconnected pores forming metal foam 90 have an open cell structure and are operable to transmit cooling air from passages 88 to outer surface 92 in selected portions of airfoil 82. In one form, airfoil 82 also includes a fully dense outer skin portion 94 that is devoid of pores. In a particular form, fully dense skin portion 94 has a thickness in the range of 0.005 inches to 0.030 inches. In other embodiments that have a fully dense skin portion, other skin thickness values may be employed. In one form, passages 88 are defined by ribs 96, which in some embodiments may be used to stiffen a hollow airfoil 82 and/or direct the flow of cooling air.

Because controlled porosity distribution 46 is explicitly defined and freeform fabricated to generate the defined porosity distribution, some embodiments of the present invention may have fully dense portions that seamlessly blend to a porous structure, such as a porous airfoil. Some embodiments of the present invention may provide a gradation of properties though the casting produced using mold 12. In one form, controlled porosity distribution 46 is used to produce an open cell structure for use as cooling air passages, e.g., for transpiration cooling of the blade produced using mold 12. In one form, cooling air can be bled into the passage(s) in the blade root (attachment) and discharged through the outer skin of the airfoil and/or other portions of the blade. This may include cooling the structure through convection, and discharging the air through the outer skin to shield the exterior surface of the blade from hot engine gases. In one form, the outer skin can have varying density to control cooling air flow and direction. In addition, by freeform fabricating the size and shape of the pores, the amount of cooling can be controlled. Further, the metal foam could be open in some portions of the blade, e.g., the pressure side of the airfoil, and closed in other portions of the blade, e.g., the suction side of the airfoil.

Embodiments of the present invention include a method for forming a porous article, comprising: freeform fabricating a ceramic mold having a controlled porosity distribution; sintering the ceramic mold; supplying a molten alloy to the sintered mold; and removing the ceramic mold to yield a cast metallic article.

In a refinement, the cast metallic article has a density that varies with location in the cast metallic article.

In another refinement, the controlled porosity distribution in the ceramic mold forms a metal foam in a portion of the cast metallic article.

In yet another refinement, the metal foam has a porosity in the range of 10 pores per inch to 100 pores per inch.

In still another refinement, the controlled porosity distribution yields a pore size in the cast metallic article that decreases with increasing proximity to an outer surface of the cast metallic article.

In yet still another refinement, the cast metallic article is a gas turbine engine blade; wherein the gas turbine engine blade includes an airfoil and an attachment structured to secure the airfoil to a gas turbine engine disc; wherein the attachment is fully dense; and wherein the airfoil has a controlled distribution of pores.

In a further refinement, the gas turbine engine blade includes a platform disposed between the attachment and the airfoil.

In a yet further refinement, the attachment includes a passage extending therethrough toward the airfoil.

In a still further refinement, the passage extends at least partially through the airfoil in a spanwise direction.

In a yet still further refinement, the ceramic mold is freeform fabricated to yield an open cell structure in at least one portion of the cast metallic article.

Embodiments of the present invention also include a method for forming a gas turbine engine blade casting, comprising: defining a distribution of interconnected nodules spaced apart by a first plurality of interconnected pores; freeform fabricating a ceramic mold, the ceramic mold including an airfoil portion having the defined distribution of interconnected nodules spaced apart by the first plurality of interconnected pores; supplying a molten alloy to the ceramic mold; solidifying the molten alloy; and leaching the interconnected nodules to yield a metallic airfoil having a second plurality of interconnected pores extending therethrough.

In a refinement, the supplying the molten alloy to the ceramic mold includes directing the molten alloy into the first plurality of interconnected pores of the ceramic mold.

In another refinement, a pore size in the metallic airfoil is in the range of 10 pores per inch to 100 pores per inch.

In yet another refinement, the embodiment further includes freeform fabricating the ceramic mold to include a blade platform portion that is operable to form a blade platform in the blade casting, wherein the blade platform is integrally formed with the metallic airfoil.

In still another refinement, the embodiment further includes freeform fabricating the ceramic mold to include an attachment portion that is operable to form a fully dense attachment in the blade casting, wherein the attachment is integrally formed with the metallic airfoil.

In yet still another refinement, the embodiment further includes freeform fabricating the ceramic mold to form a passage in blade casting that extends in a spanwise direction through the attachment toward the metallic airfoil.

In a further refinement, a pore size in the metallic airfoil is a largest pore size in locations adjacent to the passage and transitions to a smallest pore size adjacent to an outer surface of the metallic airfoil.

In a yet further refinement, the second plurality of interconnected pores are operable to transmit a fluid from the passage to an outer surface of the blade casting.

In a still further refinement, the outer surface is an outer surface of the metallic airfoil.

In a yet still further refinement, the embodiments further includes freeform fabricating the ceramic mold to form a passage in the blade casting that extends through the attachment and at least partially through the metallic airfoil in a spanwise direction; and wherein a pore size in the metallic airfoil is a largest size in locations adjacent to the passage and transitions to a smallest size in locations adjacent to an outer surface of the metallic airfoil.

In an additional refinement, the metallic airfoil includes a central portion having a largest pore size; and wherein a pore size transitions to a smallest pore size adjacent an outer surface of the metallic airfoil.

In another additional refinement, the metallic airfoil includes a fully dense outer skin portion.

Embodiments of the present invention also include a method for forming a gas turbine engine blade casting, comprising: means for forming a mold having a plurality of interconnected nodules; supplying a molten alloy to the mold; and means for removing the plurality of interconnected nodules to yield a metallic airfoil having a plurality of interconnected pores extending therethrough.

In a refinement, a density of the metallic airfoil varies with location in the metallic airfoil.

While the invention has been described in connection with what is presently considered to be the most practical and preferred embodiment, it is to be understood that the invention is not to be limited to the disclosed embodiment(s), but on the contrary, is intended to cover various modifications and equivalent arrangements included within the spirit and scope of the appended claims, which scope is to be accorded the broadest interpretation so as to encompass all such modifications and equivalent structures as permitted under the law. Furthermore it should be understood that while the use of the word preferable, preferably, or preferred in the description above indicates that feature so described may be more desirable, it nonetheless may not be necessary and any embodiment lacking the same may be contemplated as within the scope of the invention, that scope being defined by the claims that follow. In reading the claims it is intended that when words such as "a," "an," "at least one" and "at least a portion" are used, there is no intention to limit the claim to only one item unless specifically stated to the contrary in the claim. Further, when the language "at least a portion" and/or "a portion" is used the item may include a portion and/or the entire item unless specifically stated to the contrary.

What is claimed is:

1. A method for forming a porous article, comprising:
freeform fabricating a ceramic mold having a controlled porosity distribution including a distribution of interconnected nodules using a predetermined definition of porosity configuration;
sintering the ceramic mold;
supplying a molten alloy to the sintered mold; and
removing the ceramic mold and the interconnected nodules to yield a cast metallic article having a plurality of interconnected pores.

2. The method of claim 1, wherein the cast metallic article has a density that varies with location in the cast metallic article.

3. The method of claim 1, wherein the controlled porosity distribution in the ceramic mold forms a metal foam in a portion of the cast metallic article.

4. The method of claim 3, wherein the metal foam has a porosity in the range of 10 pores per inch to 100 pores per inch.

5. The method of claim 1, wherein the controlled porosity distribution yields a pore size in the cast metallic article that decreases with increasing proximity to an outer surface of the cast metallic article.

6. The method of claim 1, wherein the cast metallic article is a gas turbine engine blade; wherein the gas turbine engine blade includes an airfoil and an attachment structured to secure the airfoil to a gas turbine engine disc; wherein the attachment is fully dense; and wherein the airfoil has a controlled distribution of pores.

7. The method of claim 6, wherein the gas turbine engine blade includes a platform disposed between the attachment and the airfoil.

8. The method of claim 6, wherein the attachment includes a passage extending therethrough toward the airfoil.

9. The method of claim 8, wherein the passage extends at least partially through the airfoil in a spanwise direction.

10. The method of claim 1, wherein the ceramic mold is freeform fabricated to yield an open cell structure in at least one portion of the cast metallic article.

11. A method for forming a gas turbine engine blade casting, comprising:
   defining a distribution of interconnected nodules spaced apart by a first plurality of interconnected pores;
   freeform fabricating a ceramic mold, the ceramic mold including an airfoil portion having the defined distribution of interconnected nodules spaced apart by the first plurality of interconnected pores;
   supplying a molten alloy to the ceramic mold;
   solidifying the molten alloy; and
   leaching the interconnected nodules to yield a metallic airfoil having a second plurality of interconnected pores extending therethrough.

12. The method of claim 11, wherein said supplying the molten alloy to the ceramic mold includes directing the molten alloy into the first plurality of interconnected pores of the ceramic mold.

13. The method of claim 11, wherein a pore size in the metallic airfoil is in the range of 10 pores per inch to 100 pores per inch.

14. The method of claim 11, further comprising freeform fabricating the ceramic mold to include a blade platform portion that is operable to form a blade platform in the blade casting, wherein the blade platform is integrally formed with the metallic airfoil.

15. The method of claim 11, further comprising freeform fabricating the ceramic mold to include an attachment portion that is operable to form a fully dense attachment in the blade casting, wherein the attachment is integrally formed with the metallic airfoil.

16. The method of claim 15, further comprising freeform fabricating the ceramic mold to form a passage in blade casting that extends in a spanwise direction through the attachment toward the metallic airfoil.

17. The method of claim 16, wherein a pore size in the metallic airfoil is a largest pore size in locations adjacent to the passage and transitions to a smallest pore size adjacent to an outer surface of the metallic airfoil.

18. The method of claim 16, wherein the second plurality of interconnected pores are operable to transmit a fluid from the passage to an outer surface of the blade casting.

19. The method of claim 18, wherein the outer surface is an outer surface of the metallic airfoil.

20. The method of claim 11, further comprising freeform fabricating the ceramic mold to form a passage in the blade casting that extends through the attachment and at least partially through the metallic airfoil in a spanwise direction; and wherein a pore size in the metallic airfoil is a largest size in locations adjacent to the passage and transitions to a smallest size in locations adjacent to an outer surface of the metallic airfoil.

21. The method of claim 11, wherein the metallic airfoil includes a central portion having a largest pore size; and wherein a pore size transitions to a smallest pore size adjacent an outer surface of the metallic airfoil.

22. The method of claim 11, wherein the metallic airfoil includes a fully dense outer skin portion.

23. A method for forming a gas turbine engine blade casting, comprising:
   free-forming a ceramic mold having a plurality of interconnected nodules based on a defined distribution of the interconnected nodules;
   supplying a molten alloy to the mold; and
   removing the plurality of interconnected nodules to yield a metallic airfoil having a plurality of interconnected pores extending therethrough.

24. The method of claim 23, wherein the free-forming includes configuring the mold such that a density of the metallic airfoil varies with location in the metallic airfoil.

* * * * *